United States Patent
Ishikawa (10) Patent No.: US 12,466,385 B2
(45) Date of Patent: Nov. 11, 2025

(54) CONTROL APPARATUS FOR HYBRID VEHICLE

(71) Applicant: SUBARU CORPORATION, Tokyo (JP)

(72) Inventor: Yoichi Ishikawa, Tokyo (JP)

(73) Assignee: SUBARU CORPORATION, Tokyo (JP)

(*) Notice: Subject to any disclaimer, the term of this patent is extended or adjusted under 35 U.S.C. 154(b) by 342 days.

(21) Appl. No.: 18/177,443

(22) Filed: Mar. 2, 2023

(65) Prior Publication Data
US 2023/0294661 A1 Sep. 21, 2023

(30) Foreign Application Priority Data
Mar. 21, 2022 (JP) .................. 2022-044798

(51) Int. Cl.
*B60W 20/13* (2016.01)
*B60K 6/40* (2007.10)
(Continued)

(52) U.S. Cl.
CPC .............. *B60W 20/13* (2016.01); *B60K 6/40* (2013.01); *B60W 10/06* (2013.01); *B60W 10/08* (2013.01); *F02M 25/06* (2013.01); *B60W 2510/0657* (2013.01); *B60W 2510/244* (2013.01); *B60W 2540/106* (2013.01); *B60W 2555/20* (2020.02); *B60Y 2200/92* (2013.01)

(58) Field of Classification Search
CPC ...... B60W 20/13; B60W 10/06; B60W 10/08; B60W 2510/0657; B60W 2510/244; B60W 2540/106; B60W 2555/20; B60W 2510/0633; B60W 2510/0671; B60W 20/11; B60K 6/40; B60K 6/445; B60K 6/52; F02M 25/06; B60Y 2200/92; Y02T 10/12; Y02T 10/62
See application file for complete search history.

(56) References Cited

U.S. PATENT DOCUMENTS

2021/0086751 A1* 3/2021 Tabata .............. B60W 30/1884

FOREIGN PATENT DOCUMENTS

| JP | 2006307787 A | * | 11/2006 |
| JP | 2010-173548 A | | 8/2010 |
| JP | 2022181563 A | * | 12/2022 |

* cited by examiner

*Primary Examiner* — Aniss Chad
*Assistant Examiner* — Nikki Marie M Molina
(74) *Attorney, Agent, or Firm* — Rimon P.C.

(57) ABSTRACT

A control apparatus is provided for a hybrid vehicle including an engine with a supercharger, a blow-by gas treatment device having a ventilation line and a fresh air line, and an electric motor coupled to the engine. In low-temperature environments, transient driving conditions can lead to mixing of outside air and blow-by gas, potentially causing condensation and freezing. To address this, the control apparatus includes a control unit configured to cause the electric motor to perform regenerative operation without decreasing engine output torque when boost pressure falls below a threshold or when accelerator input decreases, under conditions where the outside air temperature is at or below a predetermined level and the boost pressure is positive. This helps maintain a positive boost pressure to prevent reverse flow in the blow-by gas system, supporting effective combustion and drivability while managing energy recovery through regeneration.

17 Claims, 4 Drawing Sheets

(51) Int. Cl.
*B60W 10/06* (2006.01)
*B60W 10/08* (2006.01)
*F02M 25/06* (2016.01)

CONTROL APPARATUS FOR HYBRID VEHICLE

CROSS-REFERENCE TO RELATED APPLICATIONS

The present application claims priority from Japanese Patent Application No. 2022-044798 filed on Mar. 21, 2022, the entire contents of which are hereby incorporated by reference.

BACKGROUND

The disclosure relates to a control apparatus for a hybrid vehicle. For example, the disclosure relates to a control apparatus for a hybrid vehicle that includes an engine with a supercharger and a blow-by gas treatment device, and an electric motor as drive sources.

In recent years, a hybrid electric vehicle (HEV) has been widely put to practical use. The HEV allows effective improvement in specific fuel consumption, i.e., fuel economy, of the vehicle by a combined use of an engine and an electric motor, i.e., a motor generator.

Further, a blow-by gas treatment device has been widely used to prevent blow-by gas leaking through a gap between a cylinder and a piston into a crankcase from being released to an environment or an atmosphere. The blow-by gas treatment device causes the blow-by gas to return to an intake system of the engine and be combusted away. For example, reference is made to Japanese Unexamined Patent Application Publication No. 2010-173548.

SUMMARY

An aspect of the disclosure provides a control apparatus to be applied to a hybrid vehicle. The control apparatus is configured to control the hybrid vehicle that includes an engine and an electric motor. The engine includes a supercharger and a blow-by gas treatment device. The blow-by gas treatment device includes a ventilation line and a fresh air line, and is configured to cause blow-by gas to be introduced into an intake system and combusted. The ventilation line allows a crankcase and a downstream side of the supercharger to communicate with each other, and is configured to cause the blow-by gas to flow back to the intake system. The fresh air line allows an upstream side of the supercharger and the crankcase to communicate with each other, and is configured to introduce fresh air. The electric motor is coupled to an output shaft of the engine to allow transmission of a torque. The control apparatus includes a control unit configured to control driving of each of the engine and the electric motor. The control unit is configured to cause the electric motor to be in regenerative operation without decreasing an output torque of the engine in one or both of: a case where a boost pressure decreases to a predetermined threshold or below, in a situation where an outside air temperature is lower than or equal to a predetermined temperature and where the boost pressure is positive; and a case where an accelerator position decreases, in the situation where the outside air temperature is lower than or equal to the predetermined temperature and where the boost pressure is positive.

An aspect of the disclosure provides a control apparatus to be applied to a hybrid vehicle. The control apparatus is configured to control the hybrid vehicle that includes an engine and an electric motor. The engine includes a supercharger and a blow-by gas treatment device. The blow-by gas treatment device includes a ventilation line and a fresh air line, and is configured to cause blow-by gas to be introduced into an intake system and combusted. The ventilation line allows a crankcase and a downstream side of the supercharger to communicate with each other, and is configured to cause the blow-by gas to flow back to the intake system. The fresh air line allows an upstream side of the supercharger and the crankcase to communicate with each other, and is configured to introduce fresh air. The electric motor is coupled to an output shaft of the engine to allow transmission of a torque. The control apparatus includes circuitry configured to control driving of each of the engine and the electric motor. The circuitry is configured to cause the electric motor to be in regenerative operation without decreasing an output torque of the engine in one or both of: a case where a boost pressure decreases to a predetermined threshold or below, in a situation where an outside air temperature is lower than or equal to a predetermined temperature and where the boost pressure is positive; and a case where an accelerator position decreases, in the situation where the outside air temperature is lower than or equal to the predetermined temperature and where the boost pressure is positive.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the disclosure.

DETAILED DESCRIPTION

In an engine including a supercharger such as a turbocharger, a boost pressure changes in accordance with an amount of pressing of an accelerator pedal, that is, an accelerator position. For example, upon pressing of the accelerator pedal, the boost pressure (an intake pressure), which is initially negative, increases in response to the pressing of the accelerator pedal and becomes positive.

For example, when an operation of pressing and releasing (returning) the accelerator pedal is performed repeatedly in the vicinity of a point of inversion of positive and negative signs of the boost pressure in a very low temperature environment at or below −20° C., forward and backward flows will alternate repeatedly in a fresh air line which allows an upstream side of the supercharger and, for example, a crankcase to communicate with each other and introduces fresh air (atmosphere). This can cause cool outside air (fresh air) and warm and moist blow-by gas inside the engine to be mixed with each other, and can sometimes cause moisture in the blow-by gas to condense and freeze into ice.

It is desirable to provide a control apparatus for a hybrid vehicle that includes an engine with a supercharger and a blow-by gas treatment device, and an electric motor as drive sources, the control apparatus making it possible to prevent moisture in blow-by gas from condensing and freezing into ice.

In the following, some example embodiments of the disclosure are described in detail with reference to the accompanying drawings. Note that the following description is directed to illustrative examples of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same reference numerals to avoid any redundant description. In addition, elements that are not directly related to any embodiment of the disclosure are unillustrated in the drawings.

Figure 1:
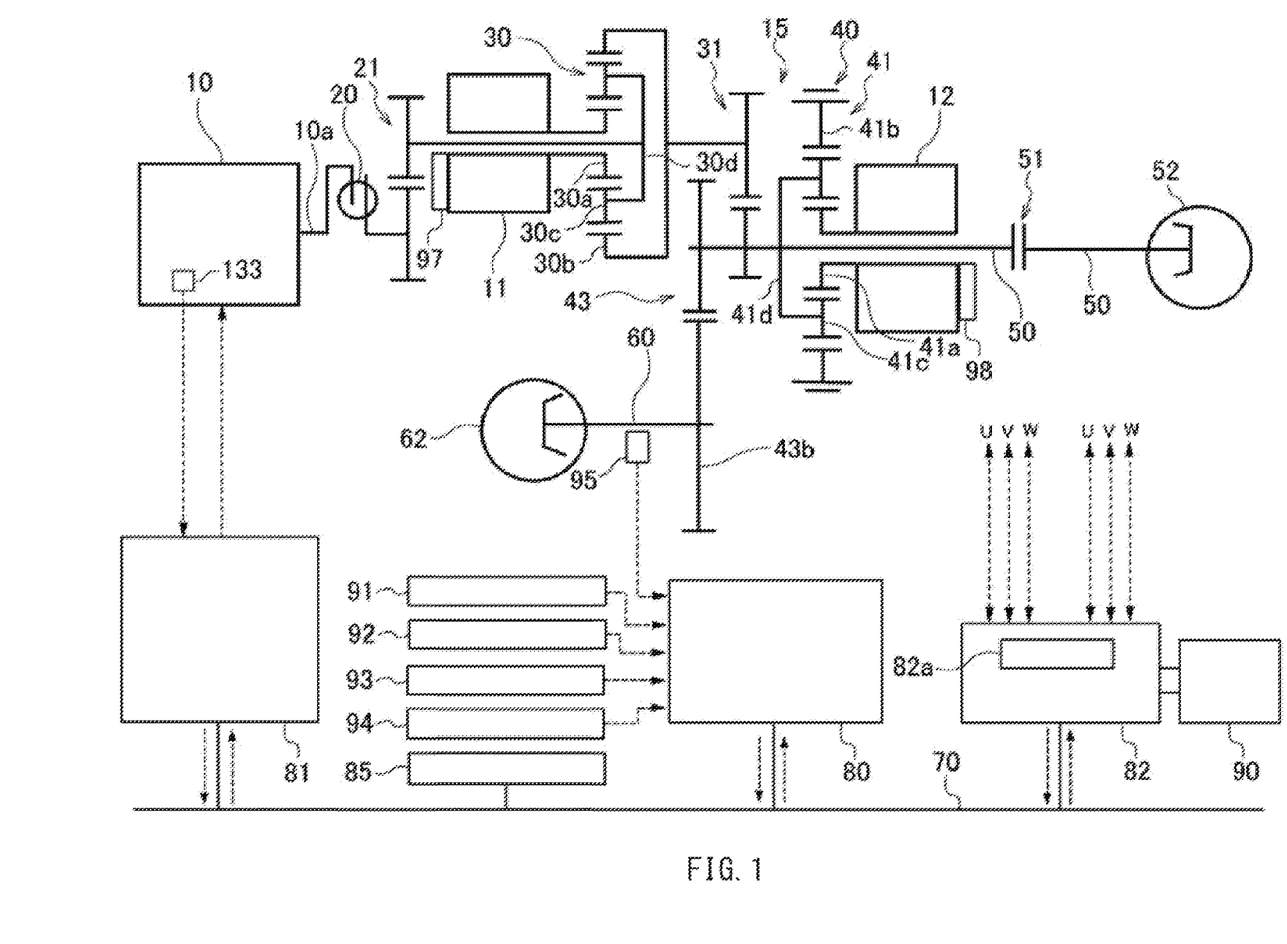
FIG. 1 is a diagram illustrating a configuration of a control apparatus for a hybrid vehicle, and the hybrid vehicle, according to one example embodiment of the disclosure.
Figure 2:
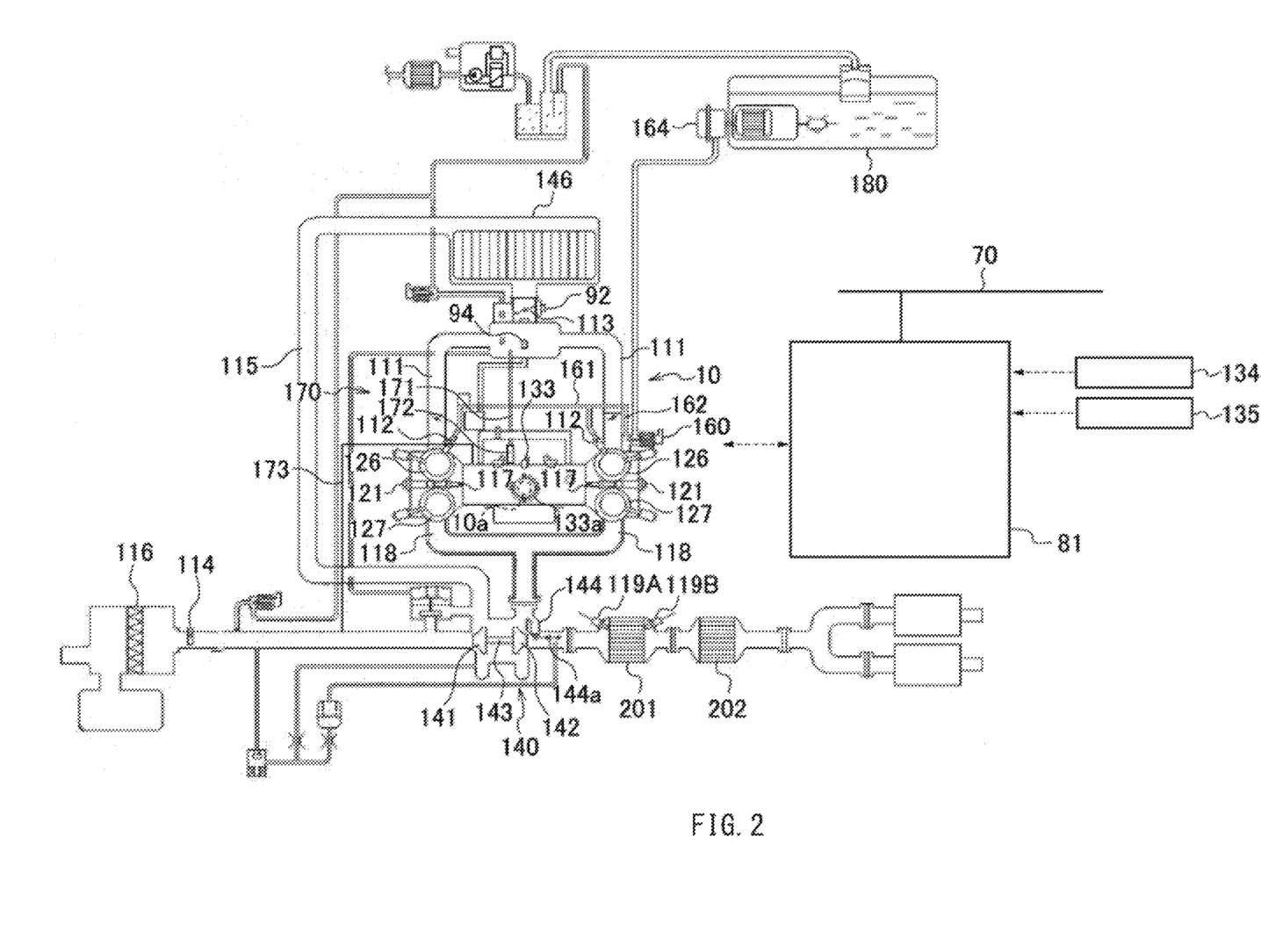
FIG. 2 is a diagram illustrating a configuration of an engine mounted on the hybrid vehicle according to one example embodiment of the disclosure.

A description will be given first of a configuration of a control apparatus for a hybrid vehicle according to an example embodiment of the disclosure with reference to FIGS. 1 and 2. The hybrid vehicle may be a hybrid automobile, for example. FIG. 1 is a diagram illustrating the configuration of the control apparatus for a hybrid vehicle, and the hybrid vehicle to which the control apparatus is applied. FIG. 2 is a diagram illustrating a configuration of an engine 10 mounted on the hybrid vehicle. Here, the description will be given of a case where the control apparatus for a hybrid vehicle is mounted on a series-parallel hybrid electric vehicle (HEV), as one example.

First, the configuration of the hybrid vehicle will be described with reference to FIG. 1. Although details of the engine 10 will be described later, the engine 10 may include a crankshaft 10a. A power split mechanism 30 may be coupled to the crankshaft 10a via a flywheel damper 20 and a pair of gears 21. The flywheel damper 20 may absorb rotational fluctuations of the engine 10. A drivetrain 15 and a first motor generator (MG) 11 may be coupled to the power split mechanism 30. In one embodiment, the first motor generator 11 may serve as an "electric motor". The drivetrain 15 may include, for example, gears and shafts, and may transmit a torque from/to drive wheels. The power split mechanism 30 may include a planetary gear mechanism including a sun gear 30a, a ring gear 30b, a pinion gear 30c, and a planetary carrier 30d, for example. The power split mechanism 30 may cause a drive torque generated by the engine 10 to be split and transmitted to the drivetrain 15 and the first motor generator 11.

For example, the planetary carrier 30d may be coupled to the crankshaft 10a of the engine 10 via the flywheel damper 20 and the pair of gears 21. The sun gear 30a may be coupled to the first motor generator 11. The ring gear 30b may be coupled via a pair of gears 31 to a propeller shaft 50 included in the drivetrain 15, and may also be coupled to a front drive shaft 60 via a drive reduction gear 43. The pair of gears 31 may be counter gears, for example.

When the first motor generator 11 serves as a generator, i.e., an electric power generator, the power split mechanism 30 may distribute a torque (a drive force) from the engine 10 received at the planetary carrier 30d to the sun gear 30a and the ring gear 30b in accordance with a gear ratio therebetween. When the first motor generator 11 serves as a motor, i.e., an electric motor, the power split mechanism 30 may combine a torque from the engine 10 received at the planetary carrier 30d and a torque from the first motor generator 11 received at the sun gear 30a, and output the combined torque to the ring gear 30b. The torque outputted to the ring gear 30b may be outputted to the propeller shaft 50 included in the drivetrain 15 via the pair of gears (counter gears) 31, and may also be outputted to the front drive shaft 60 via the drive reduction gear 43.

A second motor generator (MG) 12 may also be coupled to the drivetrain 15. In one embodiment, the second motor generator 12 may serve as the "electric motor". For example, the second motor generator 12 may be coupled to the propeller shaft 50 via a motor reduction gear 41. The second motor generator 12 may also be coupled to the front drive shaft 60 via a drive reduction gear mechanism 40 including the motor reduction gear 41 and the drive reduction gear 43. The front drive shaft 60 may transmit a torque from/to front wheels. The propeller shaft 50 may transmit a torque from/to rear wheels.

The first motor generator 11 and the second motor generator 12 may be configured as a synchronous motor generator serving as a motor that converts supplied electric power into mechanical power and also as a generator that converts received mechanical power into electric power. For example, the first motor generator 11 and the second motor generator 12 may each operate as a motor that generates a drive torque in driving the vehicle, and may each operate as a generator in performing regeneration. For example, the first motor generator 11 may operate as the generator, and the second motor generator 12 may operate as the motor.

The drive reduction gear mechanism 40 may include the motor reduction gear 41 and the drive reduction gear 43. The motor reduction gear 41 may include a planetary gear. The drive reduction gear 43 may include, for example, a spur gear or a helical gear.

The motor reduction gear 41 may include, for example, a planetary gear mechanism including a sun gear 41a, a ring gear 41b, a pinion gear 41c, and a planetary carrier 41d. When the second motor generator 12 serves as the motor, the motor reduction gear 41 may decelerate rotation caused by a torque (a drive force) transmitted from the second motor generator 12 to increase the torque, and output the increased torque from the planetary carrier 41d. In contrast, the motor reduction gear 41 may accelerate rotation caused by a torque (a drive force) received at the planetary carrier 41d to decrease the torque, and output the decreased torque from the sun gear 41a to thereby allow the second motor generator 12 to serve as the generator.

The front drive shaft 60 may transmit a torque between the drive reduction gear mechanism 40 and drive wheels. In the example illustrated in FIG. 1, the drive wheels may be front wheels. For example, torque transmitted to the front drive shaft 60 may be transmitted to a front differential 62. The front differential 62 may be a bevel gear differential, for example. The torque from the front differential 62 may be transmitted to an unillustrated left front wheel via a left front wheel drive shaft and may also be transmitted to an unillustrated right front wheel via a right front wheel drive shaft.

The propeller shaft 50 may transmit a torque from/to the rear wheels. A transfer clutch 51 may be provided at some mid-point along the propeller shaft 50. The transfer clutch 51 may adjust the torque to be transmitted to the rear wheel side. The transfer clutch 51 may control engagement force, that is, a distribution ratio of the torque to be distributed to the rear wheels, in accordance with a factor such as drive states of the four drive wheels or an engine torque. The drive states of the four drive wheels may include a slip state of the front wheels, for example. Thus, a torque transmitted to the propeller shaft 50 may be distributed in accordance with the engagement force of the transfer clutch 51 and may be further transmitted to the rear wheel side.

For example, the torque transmitted to the propeller shaft 50 and adjusted (distributed) by the transfer clutch 51 may be thereafter transmitted to a rear differential 52. A left rear wheel drive shaft and a right rear wheel drive shaft, which are not illustrated, may be coupled to the rear differential 52. A drive force from the rear differential 52 may be transmitted to an unillustrated left rear wheel via the left rear wheel drive shaft and may also be transmitted to an unillustrated right rear wheel via the right rear wheel drive shaft.

With such a configuration, it is possible for the vehicle according to the present example embodiment to drive the front wheels and the rear wheels of the vehicle with motive power from the engine 10 and the electric motor such as the second motor generator 12. The vehicle according to the present example embodiment may be an all-wheel drive (AWD) HEV, for example. It is also possible to switch between, for example, traveling that uses the motive power from the second motor generator 12 only, that is, EV traveling, and traveling that uses the motive power from the engine 10 and the electric motor such as the second motor generator 12, depending on a traveling condition. Moreover, it is possible to generate electric power, that is, perform regeneration, by using the electric motor such as the first motor generator 11.

The engine 10, the second motor generator 12, and the first motor generator 11, which are drive force sources of the vehicle, may be comprehensively controlled by a hybrid electric vehicle control unit (hereinafter, "HEV-CU") 80.

The HEV-CU 80 may include, for example, a microprocessor, an electrically erasable and programmable read-only memory (EEPROM), a random-access memory (RAM), a backup RAM, and an input and output interface (I/F). The microprocessor may perform calculations. The EEPROM may hold, for example, a program that causes the microprocessor to execute various pieces of processing. The RAM may hold various pieces of data including, for example, calculation results. The backup RAM may hold contents of the stored data.

Various kinds of sensors including, for example, an accelerator position sensor 91, a throttle angle sensor 92, an outside air temperature sensor 93, an intake pressure sensor 94, a rotation speed sensor 95, and resolvers 97 and 98, may be coupled to the HEV-CU 80. The accelerator position sensor 91 may detect the amount of pressing of the accelerator pedal, that is, the accelerator position based on an amount of operation performed on the accelerator pedal. The throttle angle sensor 92 may detect an opening angle of a throttle valve. The outside air temperature sensor 93 may detect an outside air temperature. The intake pressure sensor 94 may detect an intake manifold pressure, that is, a pressure inside an intake manifold 111 to be described later. In one embodiment, the intake pressure sensor 94 may serve as a "boost pressure sensor". The rotation speed sensor 95 may detect the number of rotations, i.e., a rotation speed, of the front drive shaft 60. The resolver 97 may detect the number of rotations, i.e., a rotation speed, of the first motor generator 11. The resolver 98 may detect the number of rotations, i.e., a rotation speed, of the second motor generator 12.

The HEV-CU 80 may be coupled to devices including, for example, an engine control unit (hereinafter, "ECU") 81 and a vehicle dynamics control unit (hereinafter, "VDCU") 85 via a controller area network (CAN) 70 in a mutually communicable manner. The ECU 81 may control the engine 10. The VDCU 85 may improve traveling stability by suppressing a skid of the vehicle, for example. The HEV-CU 80 may receive various pieces of data including, for example, an engine rotation speed and a brake operation amount, from the ECU 81 and the VDCU 85 via the CAN 70. The HEV-CU 80 may transmit various pieces of data including, for example, the respective rotation speeds of the first motor generator 11 and the second motor generator 12 to the ECU 81 via the CAN 70.

The HEV-CU 80 may comprehensively control driving of the engine 10, the second motor generator 12, and the first motor generator 11 based on these various pieces of data acquired. The HEV-CU 80 may calculate a requested output of the engine 10 and a torque command value, that is, a target motor torque, of each of the second motor generator 12 and the first motor generator 11 based on factors including, for example, the accelerator position, i.e., a drive force requested by a driver who drives the vehicle, a driving state of the vehicle, and a state of charge (SOC) of a high voltage battery 90, and may output results of the calculations. In one embodiment, the high voltage battery 90 may serve as a "storage battery".

Based on the torque command values described above, a power control unit (hereinafter, "PCU") 82 may drive the second motor generator 12 and the first motor generator 11 via an inverter 82a. The PCU 82 may include the inverter 82a that may convert direct-current electric power from the high voltage battery 90 into three-phase alternating-current electric power and supply the three-phase alternating-current electric power to the second motor generator 12 and the first motor generator 11. As described above, the PCU 82 may drive the second motor generator 12 and the first motor generator 11 via the inverter 82a based on the torque command values received from the HEV-CU 80. Upon regeneration, the inverter 82a may convert an alternating-current voltage generated by the first motor generator 11 and the second motor generator 12 into a direct-current voltage to charge the high voltage battery 90.

The ECU 81 may adjust, for example, the opening angle of an electronically controlled throttle valve 113 based on the requested output described above. Hereinafter, the electronically controlled throttle valve 113 may hereinafter be simply referred to as a "throttle valve 113".

Next, the configuration of the engine 10 mounted on the hybrid vehicle will be described in detail with reference to FIG. 2.

The engine 10 may be, for example, a horizontally-opposed four-cylinder gasoline engine including a turbocharger 140. In one embodiment, the turbocharger 140 may serve as a "supercharger". The engine 10 may include an intake pipe (an intake passage) 115. For example, an air cleaner 116, an airflow meter 114, the turbocharger 140, an intercooler 146, and the throttle valve 113 may be disposed in this order from the upstream side in the intake pipe 115.

The turbocharger 140 is a supercharger that may be disposed between the intake pipe 115 and an exhaust pipe (an exhaust passage) 118 to perform supercharging. The turbocharger 140 may include a turbine 142 and a compressor 141. The turbine 142 may be provided in the exhaust pipe 118. The compressor 141 may be provided in the intake pipe 115 and coupled to the turbine 142 via a rotary shaft 143. The turbocharger 140 may drive the turbine 142 with exhaust energy to thereby compress air with the compressor 141 coaxial therewith.

The intercooler 146 may exchange heat with intake air that has reached a high temperature as a result of being compressed by the turbocharger 140, i.e., the compressor 141, to thereby cool the intake air. The throttle valve 113 may be disposed downstream of the intercooler 146 to adjust an amount of intake air.

In the engine 10, air taken in through the air cleaner 116 and supercharged by the turbocharger 140 on an as-needed basis may be throttled by the throttle valve 113, and the throttled air may pass through the intake manifold 111 and be taken into each of cylinders provided in the engine 10. The amount of air taken in through the air cleaner 116, that is, the amount of air taken into the engine 10, may be detected by the airflow meter 114 disposed between the air cleaner 116 and the throttle valve 113. Further, the intake pressure sensor 94 serving as the boost pressure sensor may be disposed inside a collector, that is, a surge tank, included in the intake manifold 111. The intake pressure sensor 94 may detect the pressure inside the intake manifold 111, i.e., the intake manifold pressure. Furthermore, the throttle valve 113 may be provided with the throttle angle sensor 92. The throttle angle sensor 92 may detect the opening angle of the throttle valve 113.

A cylinder head of each cylinder may include an intake port and an exhaust port. The intake port and the exhaust port may be provided with an intake valve and an exhaust valve, respectively. The intake valve may open and close the intake port. The exhaust valve may open and close the exhaust port. A variable valve timing mechanism 126 may be disposed between an intake camshaft and an intake cam pulley. The intake camshaft and the intake cam pulley may drive the intake valve. The variable valve timing mechanism 126 may rotate the intake cam pulley and the intake camshaft relative to each other to continuously change a rotational phase or a displacement angle of the intake camshaft relative to the crankshaft 10a, thereby advancing and retarding a valve timing, i.e., an opening and closing timing, of the intake valve. The variable valve timing mechanism 126 may variably set the opening and closing timing of the intake valve in accordance with an engine operation state.

Similarly, a variable valve timing mechanism 127 may be disposed between an exhaust camshaft and an exhaust cam pulley. The variable valve timing mechanism 127 rotate the exhaust cam pulley and the exhaust camshaft relative to each other to continuously change a rotational phase or a displacement angle of the exhaust camshaft relative to the crankshaft 10a, thereby advancing and retarding a valve timing, i.e., an opening and closing timing, of the exhaust valve. The variable valve timing mechanism 127 may variably set the opening and closing timing of the exhaust valve in accordance with the engine operation state.

An injector 112 may be mounted on each cylinder of the engine 10. The injector 112 may inject fuel into the cylinder. The fuel may be pressurized by an unillustrated high-pressure fuel pump 160. The injector 112 may inject the pressurized fuel directly into a combustion chamber of the cylinder.

The injectors 112 may be coupled to a delivery pipe 161. The delivery pipe 161 may distribute fuel that has been transmitted under pressure by the high-pressure fuel pump 160 via a fuel pipe 162 to the injectors 112. The high-pressure fuel pump 160 may boost the pressure of the fuel suctioned by a feed pump (a low-pressure fuel pump) 164 from a fuel tank 180 to a high value such as 8 to 13 MPa in accordance with the operation state, and may feed the fuel to the delivery pipe 161. In the present example embodiment, the high-pressure fuel pump 160 may be of a type to be driven by the camshaft of the engine 10.

An ignition plug 117 and an igniter-built-in coil 121 may be mounted on the cylinder head of each cylinder. The ignition plug 117 may ignite an air-fuel mixture. The igniter-built-in coil 121 may apply a high voltage to the ignition plug 117. In each cylinder of the engine 10, the air-fuel mixture, i.e., a mixture of the intake air and the fuel injected by the injector 112, may be ignited by the ignition plug 117 and combusted. Exhaust gas generated by the combustion may be discharged through the exhaust pipe 118.

The turbine 142 included in the turbocharger 140 may be provided downstream of an assembled part of the exhaust pipe (the exhaust passage) 118. The turbocharger 140 may be provided with a waste gate 144 and a waste gate valve 144a. The waste gate 144 may guide the exhaust gas to a bypass passage from an inlet side to an outlet side of the turbine 142. The waste gate valve 144a may open and close the waste gate 144. The ECU 81 may control the degree of opening of the waste gate valve 144a to allow adjustment of the boost pressure.

An air-fuel ratio sensor 119A may be mounted on a downstream side of the turbine 142. The air-fuel ratio sensor 119A may output a signal corresponding to an oxygen concentration of the exhaust gas. The air-fuel ratio sensor 119A may be, for example, a linear air-fuel ratio sensor (an LAF sensor) which is able to detect an air-fuel ratio of the exhaust gas in a linear manner. Alternatively, the air-fuel ratio sensor 119A may be an $O_2$ sensor that detects the air-fuel ratio of the exhaust gas in an on-off manner.

A front exhaust purifying catalyst (CAT) 201 may be provided downstream of the air-fuel ratio sensor 119A. The exhaust purifying catalyst 201 may be a three-way catalyst that performs oxidization of hydrocarbon (HC) and carbon monoxide (CO) included in the exhaust gas and reduction of nitrogen oxides ($NO_x$) included in the exhaust gas at the same time to thereby purify such harmful gas components included in the exhaust gas into harmless components: carbon dioxide ($CO_2$), water vapor ($H_2O$), and nitrogen ($N_2$). A rear (i.e., after-CAT) $O_2$ sensor 119B and a rear exhaust purifying catalyst (CAT) 202 may be provided downstream of the front exhaust purifying catalyst 201. The rear $O_2$ sensor 119B may detect the air-fuel ratio of the exhaust gas in an on-off manner.

The engine 10 includes a blow-by gas treatment device 170. The blow-by gas treatment device 170 causes blow-by gas that leaks from the combustion chamber into a crankcase through a gap between the cylinder and the piston to be introduced into the intake system and combusted. The blow-by gas treatment device 170 may include, for example, a ventilation line (PCV line) 171, a positive crankcase ventilation (PCV) valve 172, and a fresh air line 173. The ventilation line (PCV line) 171 allows the inside of the crankcase and a downstream side of the turbocharger 140 or the compressor 141, such as the intake manifold 111, to communicate with each other and causes the blow-by gas to flow back into, or introduced into, the intake system. In one embodiment, the ventilation line (PCV line) 171 may serve as a "ventilation line". The PCV valve 172 may adjust an amount of flow of the blow-by gas flowing through the ventilation line (PCV line) 171. The fresh air line 173 allows an upstream side of the turbocharger 140 or the compressor 141, such as a duct before the turbocharger 140, and the inside of the crankcase to communicate with each other and introduces fresh air. In one embodiment, the fresh air line 173 may serve as a "fresh air line".

In the present example embodiment, the PCV valve 172 may be of a type to be actuated by a pressure difference between the crankcase and the downstream side of the turbocharger 140 or the compressor 141, such as the intake manifold 111, for example.

In addition to the above-described sensors including the airflow meter 114, the LAF sensor 119A, and the $O_2$ sensor 119B, a cam angle sensor may be mounted in the vicinity of a camshaft of the engine 10. The cam angle sensor may discriminate between the cylinders of the engine 10. Further, a crank angle sensor 133 may be mounted in the vicinity of the crankshaft 10a of the engine 10. The crank angle sensor 133 may detect a rotational position of the crankshaft 10a. A timing rotor 133a may be mounted on an end of the crankshaft 10a. The timing rotor 133a may include 34 tooth-like projections arranged at intervals of 10°, with two of the 34 tooth-like projections omitted. The crank angle sensor 133 may detect the rotational position of the crankshaft 10a by detecting the presence or absence of the teeth of the timing rotor 133a. The cam angle sensor and the crank angle sensor 133 may be electromagnetic pickup sensors, for example.

The foregoing sensors may be coupled to the ECU 81. Various other sensors may also be coupled to the ECU 81. Examples of the other sensors may include a cooling water temperature sensor 134 that detects a temperature of cooling water of the engine 10, and an oil temperature sensor 135 that detects a temperature of lubricating oil. The ECU 81 may receive pieces of data from the HEV-CU 80 via the CAN 70. Examples of the pieces of data may include the requested output, the rotation speed of the first motor generator 11, the rotation speed of the second motor generator 12, and the accelerator position.

The ECU 81 may include, for example, a microprocessor, an EEPROM, a RAM, a backup RAM, and an I/E The microprocessor may perform calculations. The EEPROM may hold, for example, a program that causes the microprocessor to execute various pieces of processing. The RAM may hold various pieces of data including, for example, calculation results. The backup RAM may hold contents of the stored data. The ECU 81 may further include, for example, an injector driver, an output circuit, and a motor driver. The injector driver may drive the injector 112. The output circuit may output an ignition signal. The motor driver may drive an electric motor 113a which opens and closes the electronically controlled throttle valve 113.

The ECU 81 may discriminate between the cylinders based on an output from the cam angle sensor, and may determine a rotational angular velocity and the engine rotation speed based on an output from the crank angle sensor 133. Further, the ECU 81 may acquire, based on detection signals supplied by the various sensors described above, various pieces of data including, for example, the amount of intake air, the air-fuel ratio of the air-fuel mixture, and the cooling water temperature and the oil temperature of the engine 10. Based on the requested output received from the HEV-CU 80 and the various pieces of data acquired, the ECU 81 may control a fuel injection quantity, an ignition timing, and various devices including the throttle valve 113 and the waste gate valve 144a to thereby control the engine 10.

The HEV-CU 80 described above may include a capability of preventing moisture in blow-by gas from condensing and freezing into ice. In one embodiment, the HEV-CU 80 may serve as a "control unit". In the HEV-CU 80, the microprocessor may execute the program stored in a memory such as the EEPROM. This enables the above-described capability to be implemented.

The HEV-CU 80 may thus control the electric motor such as the first motor generator 11 to be in regenerative operation without decreasing an output torque of the engine 10, in other words, so as not to decrease the output torque of the engine 10, that is, so as not to cause the boost pressure to become negative, in one or both of: a case where the boost pressure (the intake pressure) decreases to a predetermined threshold or below, in a situation where the outside air temperature is lower than or equal to a predetermined temperature (e.g., −20° C.) and where the boost pressure is positive, that is, higher than atmospheric pressure; and a case where the accelerator position decreases (by a predetermined value or more, for example), in the situation where the outside air temperature is lower than or equal to the predetermined temperature (e.g., −20° C.) and where the boost pressure is positive, that is, higher than atmospheric pressure.

In performing the above-described operation, the HEV-CU 80 may set a target regeneration amount, i.e., a target motor torque, of the electric motor such as the first motor generator 11 based on the boost pressure and a change rate of the accelerator position. For example, the EEPROM of the HEV-CU 80 may hold a map that defines a relationship between the boost pressure, the change rate of the accelerator position, and the target regeneration amount, i.e., the target motor torque, of the electric motor such as the first motor generator 11. Such a map will be referred to as a target motor torque map. The target regeneration amount, i.e., the target motor torque of the first motor generator 11 may be determined by retrieval from the target motor torque map based on the boost pressure and the change rate of the accelerator position.

Figure 4:
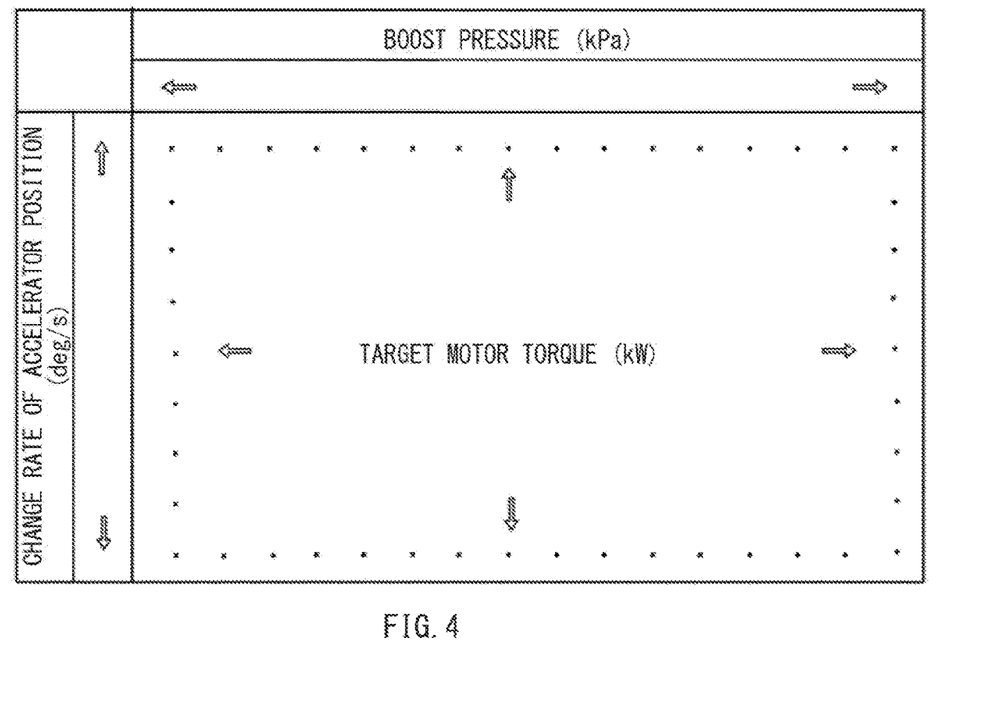
FIG. 4 is a diagram illustrating an example of a target motor torque map.

FIG. 4 illustrates an example of the target motor torque map. In FIG. 4, the horizontal axis represents the boost pressure (kPa), and the vertical axis represents the change rate of the accelerator position (deg/s). In the target motor torque map, a corresponding target motor torque (kW) is assigned to each combination (represented by a dot) of the boost pressure and the change rate of the accelerator position.

For example, the HEV-CU 80 may cause the electric motor such as the first motor generator 11 to be in regenerative operation only when the SOC of the high voltage battery (storage battery) 90 that supplies electric power to the electric motor such as the first motor generator 11 is at or below a predetermined threshold, i.e., an upper limit value. The predetermined threshold (the upper limit value) may be 80%, for example.

The HEV-CU 80 may stop the regenerative operation of the electric motor such as the first motor generator 11 when a condition is satisfied, that is, when one or more of conditions below are satisfied during the above-described regenerative operation of the electric motor such as the first motor generator 11: a condition that the boost pressure reaches or exceeds a first predetermined pressure; a condition that the boost pressure reaches or falls below a second predetermined pressure; a condition that the accelerator position or an amount of increase per unit time of the accelerator position reaches or exceeds a first predetermined value; and a condition that the accelerator position or an amount of decrease per unit time of the accelerator position reaches or falls below a second predetermined value.

For example, the HEV-CU 80 may stop the regenerative operation of the electric motor such as the first motor generator 11 further when the SOC of the high voltage battery 90 that supplies electric power to the electric motor such as the first motor generator 11 exceeds the predetermined threshold (the upper limit value, which may be 80%).

For example, the HEV-CU 80 may cause the electric motor such as the first motor generator 11 to be in powering (assisting) operation or to increase an amount of powering (assisting) when the accelerator position has increased while the boost pressure is at or below the predetermined threshold, in the situation where the outside air temperature is lower than or equal to the predetermined temperature (e.g., −20° C.) and where the boost pressure (the intake pressure) is positive, that is, higher than atmospheric pressure; or a case where the SOC of the high voltage battery 90 is at or above a predetermined value, in the situation where the outside air temperature is lower than or equal to the predetermined temperature (e.g., −20° C.) and where the boost pressure (the intake pressure) is positive, that is, higher than atmospheric pressure. This is to decrease the SOC of the high voltage battery 90 in advance to thereby prevent the SOC of the high voltage battery 90 from easily reaching the upper limit value during treatment of the blow-by gas, and to consequently avoid a possibility that it can become difficult to perform regeneration associated with the treatment of the blow-by gas.

Figure 3:
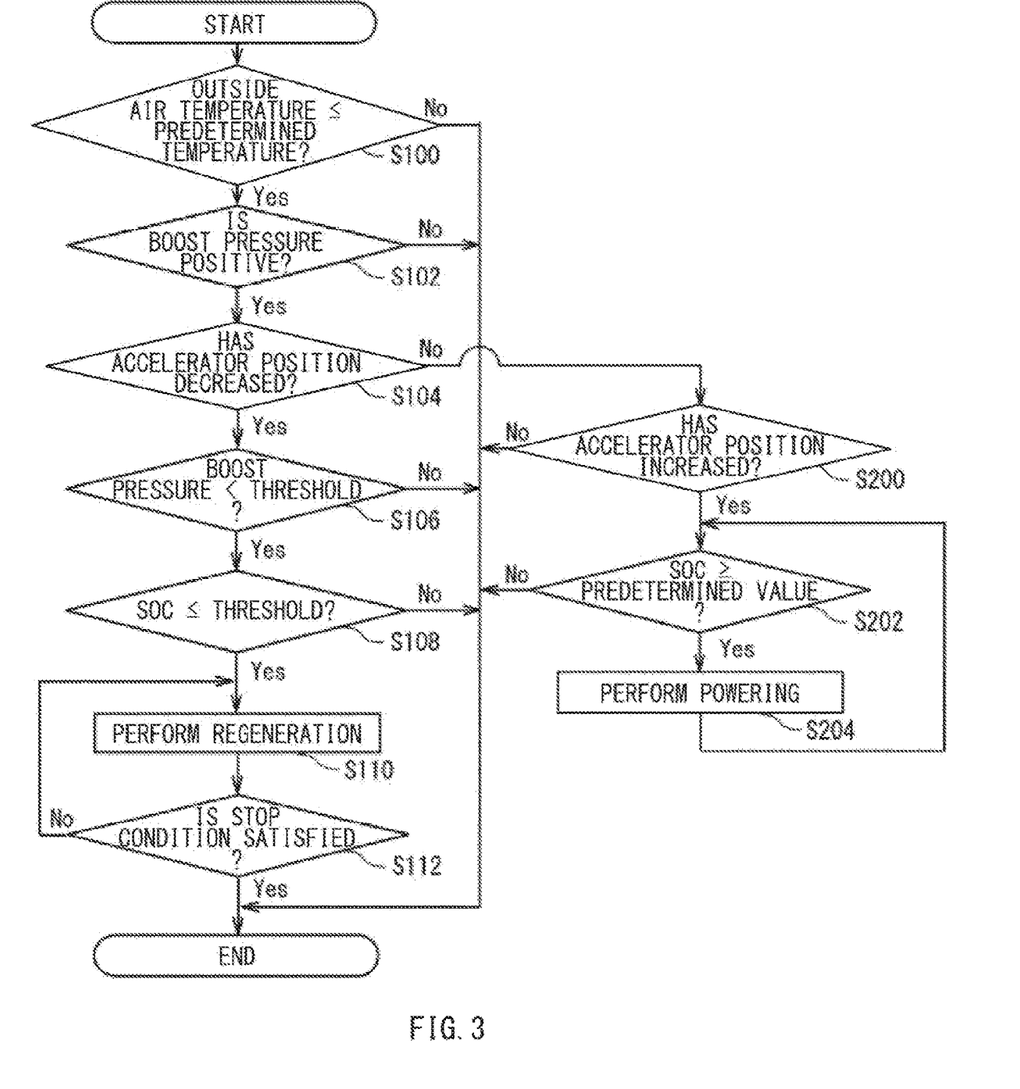
FIG. 3 is a flowchart illustrating a process procedure of motor control associated with blow-by gas treatment by the control apparatus for the hybrid vehicle according to one example embodiment of the disclosure.

Next, with reference to FIG. 3, a description will be given of operation of the control apparatus for the hybrid vehicle. FIG. 3 is a flowchart illustrating a process procedure of motor control associated with blow-by gas treatment by the control apparatus for the hybrid vehicle. This procedure may be repeatedly executed at predetermined timings by the HEV-CU 80.

In step S100, a determination may be made as to whether the outside air temperature is lower than or equal to a predetermined temperature. The predetermined temperature may be −20° C., for example. When the outside air temperature is lower than or equal to the predetermined temperature, the process may proceed to step S102. When the outside air temperature is higher than the predetermined temperature, the process ends.

In step S102, a determination may be made as to whether the boost pressure is positive. When the boost pressure is positive, the process may proceed to step S104. When the boost pressure is not positive, the process ends.

In step S104, a determination may be made as to whether the accelerator position has decreased (by a predetermined value or more). When the accelerator position has decreased, the process may proceed to step S106. When the accelerator position has not decreased, the process may proceed to step S200.

In step S106, a determination may be made as to whether the boost pressure has fallen below a first threshold. When the boost pressure has fallen below the first threshold, the process may proceed to step S108. When the boost pressure has not fallen below the first threshold, the process ends.

In step S108, a determination may be made as to whether the SOC of the high voltage battery 90 is at or below a threshold. When the SOC of the high voltage battery 90 is at or below the threshold, the process may proceed to step S110. When the SOC of the high voltage battery 90 is higher than the threshold, the process ends.

In step S110, regeneration by the electric motor such as the first motor generator 11 may be performed and the output of the engine 10 may be so controlled as not to change. The target motor torque, i.e., the target regeneration amount, in this operation may be determined by the map (the target motor torque map) defining the relationship between the boost pressure, the change rate of the accelerator position, and the target motor torque.

Next, in step S112, a determination may be made as to whether a stop condition for regeneration is satisfied. For example, determinations may be made as to: whether the SOC of the high voltage battery 90 has reached or exceeded the predetermined value; whether the boost pressure has reached or exceeded the first predetermined pressure; whether the boost pressure has reached or fallen below the second predetermined pressure; whether the accelerator position has reached or exceeded the first predetermined value; and whether the accelerator position has reached or fallen below the second predetermined value. When one or more of these conditions are satisfied, the regeneration control associated with the blow-by gas treatment may be stopped. When none of the foregoing conditions is satisfied, the process may proceed to step S110 described above, and this process (the regeneration control) may be continuously performed until any one or more of the foregoing conditions are satisfied.

In step S200, a determination may be made as to whether the accelerator position has increased (by a predetermined value or more). When the accelerator position has increased, the process may proceed to step S202. When the accelerator position has not increased, the process ends.

In step S202, a determination may be made as to whether the SOC of the high voltage battery 90 is at or above a predetermined value. When the SOC of the high voltage battery 90 is at or above the predetermined value, the process may proceed to step S204. When the SOC of the high voltage battery 90 is below the predetermined value, the process ends.

In step S204, powering (assisting) by the electric motor such as the first motor generator 11 may be performed, or the amount of powering (assisting) may be increased. Thereafter, the process may end once.

As has been described in detail above, according to the present example embodiment, the electric motor such as the first motor generator 11 may be controlled to be in regenerative operation without decreasing the output torque of the engine 10, in other words, so as not to decrease the output torque of the engine 10, that is, so as not to cause the boost pressure to become negative, in one or both of a case where the boost pressure decreases to the predetermined threshold or below and a case where the accelerator position decreases, in the situation where the outside air temperature is lower than or equal to the predetermined temperature and where the boost pressure is positive, that is, higher than atmospheric pressure. Accordingly, even if the operation of pressing and releasing (returning) the accelerator pedal is performed repeatedly in the vicinity of the point of inversion of the positive and negative signs of the boost pressure in a very low temperature environment at or below −20° C., for example, a change of the boost pressure from positive to negative is prevented. In addition, repetitions of alternate forward and backward flows are prevented in the fresh air line 173 which allows the upstream side of the supercharger and, for example, the crankcase to communicate with each other and introduces fresh air (atmosphere). This helps to prevent cool outside air (fresh air) and the warm and moist blow-by gas inside the engine from being mixed with each other. As a result, it is possible to prevent moisture in the blow-by gas from condensing and freezing into ice. Owing to the regenerative operation of the electric motor such as the first motor generator 11, it is possible to output a torque meeting the driver's requested torque to a wheel without decreasing the engine torque, that is, without decreasing the boost pressure.

According to the present example embodiment, the regenerative operation of the electric motor such as the first motor generator 11 may be performed when the SOC of the high voltage battery 90 is at or below the predetermined threshold. This helps to prevent overcharging of the high voltage battery 90.

According to the present example embodiment, the regenerative operation of the electric motor such as the first motor generator 11 may be stopped when one or more of the conditions below are satisfied during the regenerative operation of the electric motor: the condition that the boost pressure reaches or exceeds the first predetermined pressure; the condition that the boost pressure reaches or falls below the second predetermined pressure; the condition that the accelerator position or the amount of increase per unit time of the accelerator position reaches or exceeds the first predetermined value; and the condition that the accelerator position or the amount of decrease per unit time of the accelerator position reaches or falls below the second predetermined value. Accordingly, when it is determinable that the driver intends to perform sudden deceleration or acceleration, it is possible to place priority on the driver's intention and to stop regeneration. This helps to prevent deterioration in drivability.

According to the present example embodiment, the electric motor such as the first motor generator 11 may be caused to be in powering (assisting) operation or the amount of powering (assisting) may be increased when the accelerator position has increased while the boost pressure is at or below the predetermined threshold or a case where the SOC of the high voltage battery 90 is at or above the predetermined value, in the situation where the outside air temperature is lower than or equal to the predetermined temperature and where the boost pressure is positive, that is, higher than atmospheric pressure. Accordingly, it is possible to decrease the SOC of the high voltage battery 90 in advance to thereby prevent the SOC of the high voltage battery 90 from easily reaching the upper limit value during treatment of the blow-by gas, and to consequently avoid a possibility that it can become difficult to perform regeneration associated with the treatment of the blow-by gas.

Although some example embodiments of the disclosure have been described in the foregoing by way of example with reference to the accompanying drawings, the disclosure is by no means limited to the embodiments described above. It should be appreciated that modifications and alterations may be made by persons skilled in the art without departing from the scope as defined by the appended claims. The disclosure is intended to include such modifications and alterations in so far as they fall within the scope of the appended claims or the equivalents thereof. For example, the foregoing example embodiment has been described with reference to the case where the control apparatus according to an embodiment of the disclosure is applied to a series-parallel hybrid electric vehicle (HEV). However, the control apparatus according to an embodiment of the disclosure is also applicable to a different type of hybrid electric vehicle such as a parallel hybrid electric vehicle, or a plug-in hybrid electric vehicle (PHEV) that is externally chargeable. In the forgoing example embodiment, the two electric motors, that is, the first motor generator 11 and the second motor generator 12 may be provided. However, the number of electric motors is not limited to two, and thus a single motor, or three or more motors may be provided. Similarly, the configuration of the driving system including the multiple gears and shafts is not limited to the configuration of the foregoing example embodiment.

The system configurations of controllers including the HEV-CU 80 and the ECU 81, and allocation of operation between the controllers are not be limited to those described in the foregoing example embodiment. The foregoing example embodiment has been described with reference to the case of applying an embodiment of the disclosure to an AWD vehicle; however, an embodiment of the disclosure is also applicable to, for example, two-wheel drive (2WD) vehicles, including a front-wheel drive (FF) vehicle and a rear-wheel drive (FR) vehicle.

In the foregoing example embodiment, the turbocharger may be used as the supercharger. However, the supercharger is not limited to the turbocharger, and may be a mechanically-driven supercharger, for example.

The HEV-CU 80 illustrated in FIG. 1 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the HEV-CU 80 illustrated in FIG. 1. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of the HEV-CU 80 illustrated in FIG. 1.

The invention claimed is:

1. A control apparatus configured for use in a hybrid vehicle that comprises an engine and an electric motor,
   the engine comprising a supercharger and a blow-by gas treatment device, the blow-by gas treatment device comprising a ventilation line and a fresh air line and being configured to cause blow-by gas to be introduced into an intake system and combusted, the ventilation line allowing a crankcase and a downstream side of the supercharger to communicate with each other and being configured to cause the blow-by gas to flow back to the intake system, the fresh air line allowing an upstream side of the supercharger and the crankcase to communicate with each other and being configured to introduce fresh air,
   the electric motor being coupled to an output shaft of the engine to allow transmission of a torque,
   the control apparatus comprising:
     one or more processors; and
     one or more memories storing instructions for causing the one or more processors to:
       control driving of each of the engine and the electric motor; and
     cause the electric motor to be in regenerative operation without decreasing an output torque of the engine in one or both of: a case where a boost pressure decreases to a predetermined threshold or below, in a situation where an outside air temperature is lower than or equal to a predetermined temperature and where the boost pressure is positive; and a case where an accelerator position decreases, in the situation where the outside air temperature is lower than or equal to the predetermined temperature and where the boost pressure is positive.

2. The control apparatus according to claim 1, wherein the one or more processors are further configured to cause the electric motor to be in the regenerative operation further when a state of charge of a storage battery that supplies electric power to the electric motor is at or below a predetermined threshold.

3. The control apparatus according to claim 2, wherein the one or more processors are further configured to set a target regeneration amount of the electric motor based on the boost pressure and a change rate of the accelerator position.

4. The control apparatus according to claim 3, wherein the one or more processors are further configured to stop the regenerative operation of the electric motor when one or more of conditions below are satisfied during the regenerative operation of the electric motor: a condition that the boost pressure reaches or exceeds a first predetermined pressure; a condition that the boost pressure reaches or falls below a second predetermined pressure; a condition that the accelerator position reaches or exceeds a first predetermined value; and a condition that the accelerator position reaches or falls below a second predetermined value.

5. The control apparatus according to claim 4, wherein the one or more processors are further configured to cause the electric motor to be in powering operation or to increase an amount of powering when the accelerator position increases while the boost pressure is at or below the predetermined threshold, in the situation where the outside air temperature is lower than or equal to the predetermined temperature and where the boost pressure is positive; or when the state of charge of the storage battery that supplies electric power to the electric motor is at or above a predetermined value, in the situation where the outside air temperature is lower than or equal to the predetermined temperature and where the boost pressure is positive.

6. The control apparatus according to claim 3, wherein the one or more processors are further configured to cause the electric motor to be in powering operation or to increase an amount of powering when the accelerator position increases while the boost pressure is at or below the predetermined threshold, in the situation where the outside air temperature is lower than or equal to the predetermined temperature and where the boost pressure is positive; or when the state of charge of the storage battery that supplies electric power to the electric motor is at or above a predetermined value, in the situation where the outside air temperature is lower than or equal to the predetermined temperature and where the boost pressure is positive.

7. The control apparatus according to claim 2, wherein the one or more processors are further configured to stop the regenerative operation of the electric motor when one or more of conditions below are satisfied during the regenerative operation of the electric motor: a condition that the boost pressure reaches or exceeds a first predetermined pressure; a condition that the boost pressure reaches or falls below a second predetermined pressure; a condition that the accelerator position reaches or exceeds a first predetermined value; and a condition that the accelerator position reaches or falls below a second predetermined value.

8. The control apparatus according to claim 7, wherein the one or more processors are further configured to cause the electric motor to be in powering operation or to increase an amount of powering when the accelerator position increases while the boost pressure is at or below the predetermined threshold, in the situation where the outside air temperature is lower than or equal to the predetermined temperature and where the boost pressure is positive; or when the state of charge of the storage battery that supplies electric power to the electric motor is at or above a predetermined value, in the situation where the outside air temperature is lower than or equal to the predetermined temperature and where the boost pressure is positive.

9. The control apparatus according to claim 2, wherein the one or more processors are further configured to cause the electric motor to be in powering operation or to increase an amount of powering when the accelerator position increases while the boost pressure is at or below the predetermined threshold, in the situation where the outside air temperature is lower than or equal to the predetermined temperature and where the boost pressure is positive; or when the state of charge of the storage battery that supplies electric power to the electric motor is at or above a predetermined value, in the situation where the outside air temperature is lower than or equal to the predetermined temperature and where the boost pressure is positive.

10. The control apparatus according to claim 1, wherein the one or more processors are further configured to set a target regeneration amount of the electric motor based on the boost pressure and a change rate of the accelerator position.

11. The control apparatus according to claim 10, wherein the one or more processors are further configured to stop the regenerative operation of the electric motor when one or more of conditions below are satisfied during the regenerative operation of the electric motor: a condition that the boost pressure reaches or exceeds a first predetermined pressure; a condition that the boost pressure reaches or falls below a second predetermined pressure; a condition that the accelerator position reaches or exceeds a first predetermined value; and a condition that the accelerator position reaches or falls below a second predetermined value.

12. The control apparatus according to claim 11, wherein the one or more processors are further configured to cause the electric motor to be in powering operation or to increase an amount of powering when the accelerator position increases while the boost pressure is at or below the predetermined threshold, in the situation where the outside air temperature is lower than or equal to the predetermined temperature and where the boost pressure is positive; or when a state of charge of a storage battery that supplies electric power to the electric motor is at or above a predetermined value, in the situation where the outside air temperature is lower than or equal to the predetermined temperature and where the boost pressure is positive.

13. The control apparatus according to claim 10, wherein the one or more processors are further configured to cause the electric motor to be in powering operation or to increase an amount of powering when the accelerator position increases while the boost pressure is at or below the predetermined threshold, in the situation where the outside air temperature is lower than or equal to the predetermined temperature and where the boost pressure is positive; or when a state of charge of a storage battery that supplies electric power to the electric motor is at or above a predetermined value, in the situation where the outside air temperature is lower than or equal to the predetermined temperature and where the boost pressure is positive.

14. The control apparatus according to claim 1, wherein the one or more processors are further configured to stop the regenerative operation of the electric motor when one or more of conditions below are satisfied during the regenerative operation of the electric motor: a condition that the boost pressure reaches or exceeds a first predetermined pressure; a condition that the boost pressure reaches or falls below a second predetermined pressure; a condition that the accelerator position reaches or exceeds a first predetermined value; and a condition that the accelerator position reaches or falls below a second predetermined value.

15. The control apparatus according to claim 14, wherein the one or more processors are further configured to cause the electric motor to be in powering operation or to increase an amount of powering when the accelerator position increases while the boost pressure is at or below the predetermined threshold, in the situation where the outside air temperature is lower than or equal to the predetermined temperature and where the boost pressure is positive; or when a state of charge of a storage battery that supplies electric power to the electric motor is at or above a predetermined value, in the situation where the outside air temperature is lower than or equal to the predetermined temperature and where the boost pressure is positive.

16. The control apparatus according to claim 1, wherein the one or more processors are further configured to cause the electric motor to be in powering operation or to increase an amount of powering when the accelerator position increases while the boost pressure is at or below the predetermined threshold, in the situation where the outside air temperature is lower than or equal to the predetermined temperature and where the boost pressure is positive; or when a state of charge of a storage battery that supplies electric power to the electric motor is at or above a predetermined value, in the situation where the outside air temperature is lower than or equal to the predetermined temperature and where the boost pressure is positive.

17. A control apparatus configured for use in hybrid vehicle that comprises an engine and an electric motor,
the engine comprising a supercharger and a blow-by gas treatment device, the blow-by gas treatment device comprising a ventilation line and a fresh air line and being configured to cause blow-by gas to be introduced into an intake system and combusted, the ventilation line allowing a crankcase and a downstream side of the supercharger to communicate with each other and being configured to cause the blow-by gas to flow back to the intake system, the fresh air line allowing an upstream side of the supercharger and the crankcase to communicate with each other and being configured to introduce fresh air,
the electric motor being coupled to an output shaft of the engine to allow transmission of a torque,
the control apparatus comprising circuitry configured to:
control driving of each of the engine and the electric motor; and
cause the electric motor to be in regenerative operation without decreasing an output torque of the engine in one or both of: a case where a boost pressure decreases to a predetermined threshold or below, in a situation where an outside air temperature is lower than or equal to a predetermined temperature and where the boost pressure is positive; and a case where an accelerator position decreases, in the situation where the outside air temperature is lower than or equal to the predetermined temperature and where the boost pressure is positive.

* * * * *